Dec. 24, 1963   J. RUDELICK   3,114,968
METHOD OF MAKING PRESSURE VESSELS
Filed Sept. 20, 1961   2 Sheets-Sheet 1

INVENTOR
John Rudelick

Dec. 24, 1963  J. RUDELICK  3,114,968
METHOD OF MAKING PRESSURE VESSELS
Filed Sept. 20, 1961  2 Sheets-Sheet 2

Inventor
John Rudelick

United States Patent Office 3,114,968
Patented Dec. 24, 1963

3,114,968
METHOD OF MAKING PRESSURE VESSELS
John Rudelick, Milwaukee, Wis., assignor to Bruner Corporation, Milwaukee, Wis., a corporation of Wisconsin
Filed Sept. 20, 1961, Ser. No. 139,421
3 Claims. (Cl. 29—421)

This invention relates generally to a method of making tanks and vessels in which fluid materials can be held under some degree of pressure; and in a more specific sense the invention relates to a method of making a pressure vessel having an inert and non-corroding surface at its interior. The article made by the method of this invention is claimed in my copending application, Serial No. 2,644, filed January 15, 1960.

Heretofore tanks adapted to hold water under pressure, such as the tanks of water heaters, water softeners and the like, have generally been fabricated of plate or sheet metal, and have frequently been provided with some kind of glass or porcelain liner that was intended to form an inert and non-corroding interior surface for the tank and to render it leakproof. The success of such a liner was dependent primarily upon how clean the interior surface of the tank could be made before the liner material was applied to it. However, it was almost impossible to effect perfect cleansing of the metal surface because there were always fissures or crannies present around spuds (inlet and outlet fittings) or around the welded joints between the end bells of the tank and its cylindrical side walls. Moreover, glass and porcelain linings would not permanently adhere to weld beads, or even to spot welds, and in such areas the liner material tended to fall away from the inner surface of the tank and permit corrosion to start.

In an effort to provide a satisfactorily inert and non-corroding interior surface for the fabricated metal tanks used in water softening and water conditioning apparatus, tanks made entirely of plastic or plastic impregnated fibreglass have been tried, but in most cases have proved unsatisfactory. One usual manner of forming such tanks and liners was by the "lay-up" method, wherein a layer of plastic material was sprayed onto a form, a layer of fibreglass rovings was applied to the plastic, and another layer of plastic was sprayed over the rovings, the alternate layers of plastic and fibreglass being built up in this manner until the desired thickness of material had been attained. Tanks made by the "lay-up" method, besides being expensive to manufacture, were costly to handle and ship because they could not stand severe impacts or high localized pressures. Their most important disadvantage, however, was that they were subject to "weeping," i.e., slight leakage through minute holes and fissures.

Another commonly used method of manufacturing tanks and pressure vessels was to form them in several parts, each produced by vacuum forming of sheet material, by the "lay-up" method, or in some other manner, with the several parts joined by bonded seams. Such tanks had the disadvantage that they were often unattractive or even unsightly in appearance, and frequently had the more serious defect of leaking at the seams.

It has also been proposed to incorporate a flexible plastic bag in a fabricated metal tank such as used in water softeners, but such a bag-like liner was never successful. It was not only very troublesome to install and service, but the material from which the bag had to be made would not stand up in use.

By contrast it is an object of this invention to provide a method of forming a pressure vessel having an inert and non-corroding surface at its interior which comprises a tank of homogeneous thermoplastic material formed in one rigid piece in such a manner as to avoid porosity which might give rise to weeping, and having an inexpensive and easily manufactured rigid shell surrounding and closely embracing the tank to support the same and reinforce it against high pressure.

More specifically it is an object of this invention to provide a method of inexpensively producing a tank or pressure vessel of the type disclosed and claimed in my aforesaid copending application, comprising an inner tank of inert thermoplastic material which is seamless, tough, non-porous, and has good form retaining characteristics, and an outer reinforcing shell of metal, which can either be built up or cast in one piece; which method provides for formation of the inner tank from a length of plastic tubing without requiring the provision of a mold or die for shaping the tubing to form the tank therefrom.

Another specific object of this invention is to provide a method of forming a tank or pressure vessel of the character described, comprising an outer reinforcing shell of metal that is cast in one piece and has a large diameter substantially cylindrical medial portion and smaller diameter tubular end portions, and an inner tank or pressure vessel of inert thermoplastic material shaped to have its exterior surface in close contact with the inner surface of the reinforcing shell.

It is also an object of this invention to provide a method of making a tank or pressure vessel of the character described that requires no highly skilled labor or special materials and can be carried out with relatively simple and inexpensive equipment at a high rate of production.

With the above and other objects in view which will appear as the description proceeds, this invention resides in the novel method substantially as hereinafter described and more particularly defined by the appended claims, it being understood that such changes in the precise embodiment of the herein disclosed invention may be made as come within the scope of the claims.

The accompanying drawings illustrate one complete example of the practice of the method of this invention according to the best mode so far devised for the practical application of the principles thereof, and in which.

Figure 3:
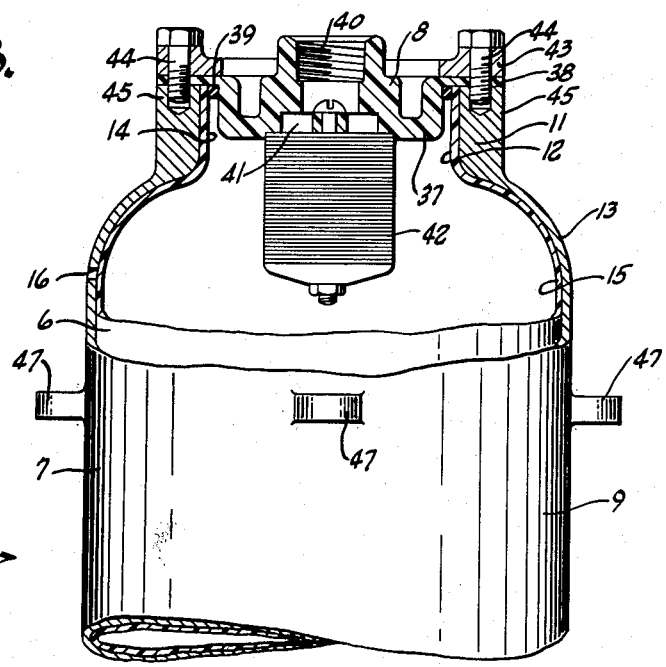
FIGURE 3 is a view, partly in elevation and partly in section, of a completed tank made in accordance with the principles of this invention.
Figure 3:
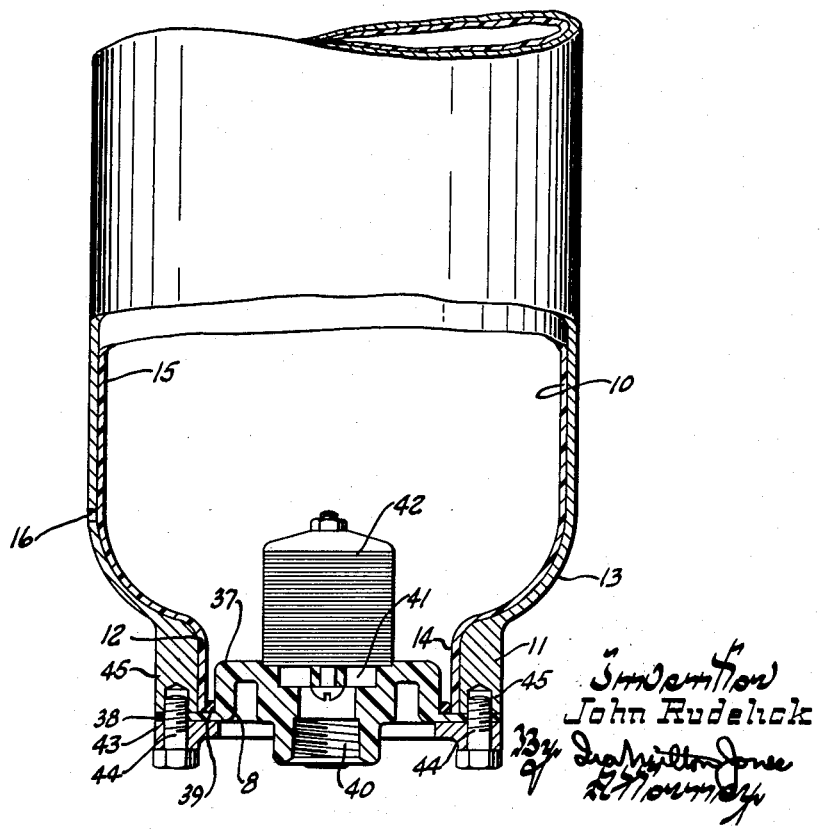

Referring now more particularly to the accompanying drawings, and first considering FIGURE 3, the numeral 5 designates generally a tank or pressure vessel made in accordance with the method of this invention, and which comprises, in general, an inert and non-corroding liner 6 of homogeneous thermoplastic material, a shell 7 surrounding and closely embracing the liner, and a pair of end plugs 8.

The shell 7 is preferably formed in one piece, and may be an aluminum sand casting. If desired, it could be formed in two or more parts, for example, as a pair of sand or die castings adapted to be threaded together intermediate the ends of the shell; or it could be built up like a conventional hot water boiler, of a rolled plate and preformed end bells, with welded seams. The shell has a large diameter medial portion 9 which is generally cylindrical and which defines an interior cavity 10, and coaxial smaller diameter tubular end portions 11 which define bores 12 that open to each end of the shell and communicate with its interior cavity 10. Each bore 12 has a uniform diameter along a substantial distance inwardly from its outer end, and the two bores are equal in diameter. Each tubular end portion 11 is connected with the cylindrical medial portion 9 of the shell by a hemispherically rounded shoulder 13.

The liner 6 extends through the shell from one end to the other thereof, with its exterior surface in intimate contact with the interior surface of the shell. Thus the liner has coaxial tubular end portions 14 in the bores 12 of the shell and a coaxial larger diameter medial portion 15. Because of the manner in which the liner is formed, described hereinafter, the tubular end portions of the liner have a somewhat greater wall thickness than its medial portion.

Although herein referred to as a "liner," the thermoplastic element 6 actually constitutes the pressure vessel, and the shell 7 merely affords support and reinforcement for it and protects it from sharp blows and the like. Hence the shell need not be imperforate, and in fact it has one or more vent apertures 16 in its wall, inwardly of its tubular end portions 11.

During the manufacture of the pressure vessel according to the method of this invention the thermoplastic liner 6 is formed directly in the shell from a tubular blank 17, and the shell thus functions as a mold or die by which the desired shape is imparted to the thermoplastic liner during the forming operation, as well as serving as a housing, protector and reinforcement for the finished tank.

The tubular blank 17 can be formed by extrusion or by any other suitable process, and it should have a uniform wall thickness, an outside diameter which gives it a close slip fit in the bores 12 in the shell, and a length substantially equal to that of the shell. It should be formed of a thermoplastic material that is self-supporting when in its normal cooled condition. Obviously the blank should be homogeneous; that is, it should not have glass fibres or the like incorporated in it. Materials that have been found suitable for the purpose include such high density thermoplastics as polystyrene, vinyl, acrylic resins and polyethylene. The wall thickness of the tubular blank is not critical, so long as it is uniform and sufficient to bear expansion to the desired diameter of the medial portion without rupturing. For example, a 4¼" O.D. kralastic tubular blank having a 3/16" wall thickness has been very successfully expanded to a 7¼" diameter medial portion.

The apparatus for forming the liner comprises a steam generator 20 for providing a source of live steam capable of a pressure of at least about 50 p.s.i., a source of air under pressure of at least about 70 p.s.i., such as a pump or pressure tank, a pair of plugs 22 and 23 which can be temporarily installed on the ends of the tubular blank to close the same, and suitable ducting, valves and pressure gages, described hereinafter.

The tubular blank 17, cut to the proper length, is axially inserted into the shell, with its end portions received in the bores 12 in the shell, and then the plugs 22 and 23 are installed on the ends of the shell, to plug the tubular blank. The shell is preferably disposed in the apparatus with its axis upright so that the blank will not deform eccentrically as it heats, due to "drooping."

The plug 23 that fits on the lower end of the shell has a bore 23' therethrough that communicates the interior of the blank, by way of an outlet duct 25, with a manually operable two-way valve 26. The plug 22 that closes the upper end of the blank likewise has a coaxial bore 22' therethrough, and said plug is connected with an inlet duct 27 that is in turn communicated with the steam generator 20 by means of a steam duct 28 and with the air pressure source by means of a pressure air duct 29. A T 30 connects the steam and pressure air ducts with the inlet duct 27. A manually operable two-way steam valve 31 in the steam duct 28 controls the admission of steam from the steam generator to the inlet duct 27 and hence to the interior of the blank; and a similar air valve 32 in the air duct 29 controls the admission of pressure air to the interior of the blank.

Preferably an O-ring 33 is seated in a circumferential groove in each of the plugs 22 and 23 to provide a good seal between the plugs and the end portions of the tubular blank.

When the blank and shell are properly connected in the apparatus, the steam valve 31 is opened to allow steam from the steam generator to flow through the tubular blank to heat the latter. At this time the air valve 32 is kept closed so that pressure air cannot flow to the blank, but the outlet valve 26 is open to allow the steam to flow through the blank and heat the same. Either the outlet duct 25 should incorporate a throttling restrictor or the outlet valve 26 should be so arranged as to afford some degree of throttling when fully open, so that 5 to 8 p.s.i. of steam pressure is maintained in the tubular blank, as indicated by a pressure gage 35 in the inlet duct 27. The outlet duct 25 can open to the atmosphere, as shown, or can be connected to a suitable pump for return of condensate to the steam generator.

The steam should be allowed to circulate through the liner for approximately 10 minutes to assure that the plastic material will be sufficiently heated, and during this interval the 5 to 8 p.s.i. steam pressure should be maintained.

Figure 1:
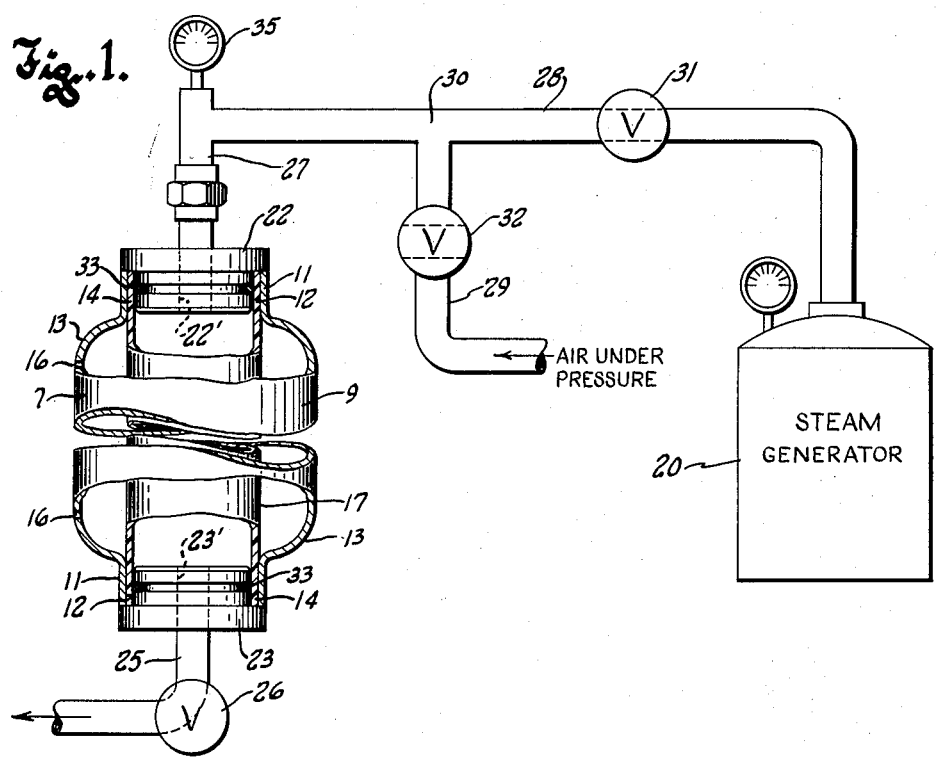
FIGURE 1 is a more or less diagrammatic view, partly in elevation and partly in section, of one form of apparatus that can be used for practicing the method of this invention, in which apparatus is mounted a prefabricated shell and a plastic blank that is to be formed into a tank.
Figure 2:
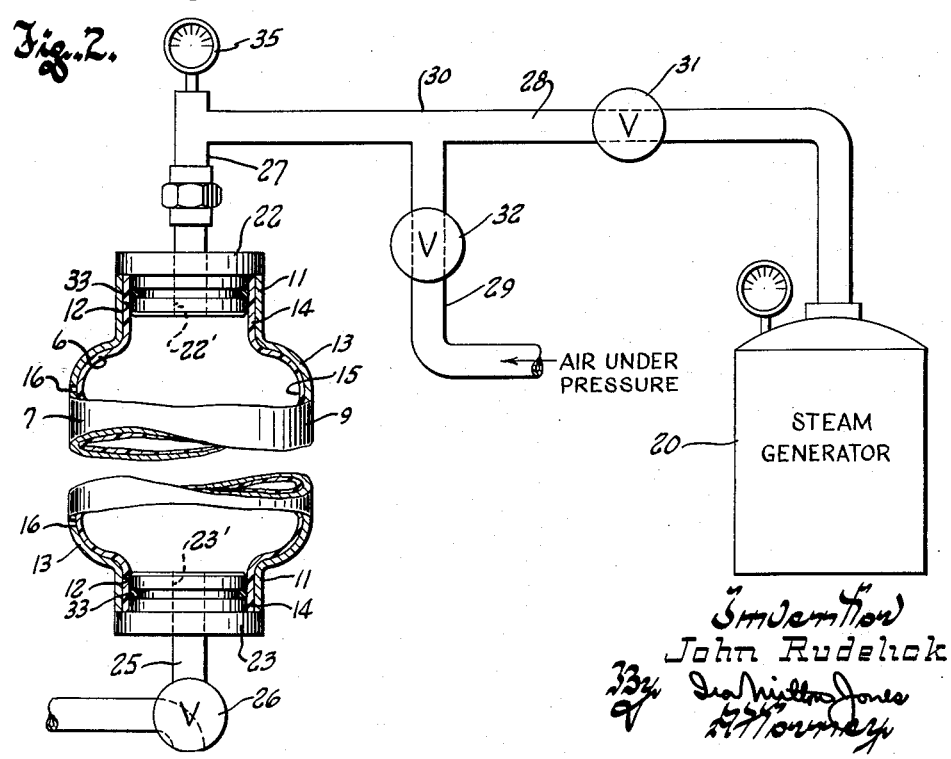
FIGURE 2 is a view similar to FIGURE 1 but showing the tank at the completion of the forming operation.

When the material of the tubular blank has become sufficiently plastic, under the heating influence of the steam flowing therethrough, it will expand to the inside contour of the shell, to substantially the condition shown in FIGURE 2, due to the steam pressure maintained in the blank as heating takes place. As the blank expands, air is of course expelled from the space between it and the shell through the vent apertures 16 in the shell wall.

Upon expansion of the blank the wall of its medial portion decreases in thickness, and some axially inward pull is exerted on its end portions. The O-rings 33 should have a sufficiently tight fit between the plugs 22 and 23 and the end portions of the blank so that they are maintained under substantial compression, and they thus cooperate with the tubular end portions 11 of the shell in exerting a radial clamping force upon the end portions of the blank to prevent the latter from being drawn inwardly.

Ordinarily in the blow molding of thermoplastic material suitable means are provided for cooling the die or mold, so that when the material is expanded into contact with the mold wall it is almost instantly cooled below its plastic temperature, and thus "sets up" immediately. In this case, however, the shell tends to be heated by the steam passed through the blank, since the heat of the steam is conducted directly into the tubular end portions 11 of the shell, and thence to all portions of the shell wall. Hence if steam pressure were released immediately after the blank had expanded, it would remain in plastic condition and would return to substantially its original tubular shape before it had cooled below its plastic temperature. The provision of cooling means for the shell would not only be expensive in itself but would most likely cause the apparatus to be cumbersome in use and would slow down the rate of production.

Provision is therefore made for cooling the plastic while maintaining pressure on its interior surface, and to this end the outlet valve 26 is closed after the plastic has formed, and steam pressure is allowed to build up in the tank until the gage 35 shows a pressure of about 50 p.s.i. As such steam pressure is building in the liner, any portions of the liner that had not been forced into intimate contact with the shell during its initial expansion will be firmly engaged against the inner surface of the shell, so that the liner will very closely conform to the internal shape of the shell.

As soon as steam pressure reaches about 50 p.s.i., air valve 32 is opened to introduce air into the tank along with the steam. Both the steam valve 31 and the air valve 32 are kept open until pressure in the vessel reaches a value of about 70 p.s.i., as shown by gage 35, the outlet valve 26 being meanwhile kept closed. As pressure rises toward the 70 p.s.i. value, pressure air will force steam out of the inlet duct 27, and such air may even back up into the steam generator although this will be of no consequence.

When pressure on gage 35 reaches a value of about 70 p.s.i., the steam valve 31 is closed and the outlet valve 26 is opened partway, to maintain an indicated pressure on gage 35 of about 30 p.s.i. The pressure air now purges the live steam out of the newly formed liner and cools the liner, meanwhile maintaining a pressure on its interior that holds it expanded into intimate contact with the internal surface of the shell.

As soon as the plastic has cooled and set up, the air valve 32 can be closed, the outlet valve 26 can be fully opened in preparation for forming of another tank, and the end plugs 22 and 23 can be removed to disconnect the newly formed vessel from the forming apparatus.

When the tank is removed from the forming apparatus, permanent end plugs 8, which may be formed of plastic, can be installed thereon. Each end plug has a cylindrical body portion 37 of substantial axial length, adapted to project into a tubular end portion 14 of the liner, and a radially projecting flange 38 adapted to overlie adjacent ends of the liner and shell. An O-ring 39 confined radially between the body portion 37 of each plug and the inner surface of the liner end portion 14 provides a leak proof seal between the plug and the liner. The plug may be imperforate, or it may have a threaded aperture 40 to provide for connection of an inlet or outlet fitting. Since the end plugs are molded of plastic, it is also a simple matter to provide each of them, if desired, with a rib 41 extending substantially diametrically across the aperture 40 and which provides a spider-like support for a disc distributor 42 that can be of known construction.

Each end plug is secured in place by means of an end ring 43 which overlies the flange 38 on the plug and clampingly confines said flange axially against the rim of the tubular end portion 14 of the liner. Screws 44, extending parallel to the tank axis through aligned holes in the end ring and threaded into bosses 45 on the end portion of the adjacent shell member, fasten the end ring in place and thus secure the end plug with which it cooperates.

The shell 7 can also be provided with mounting lugs 47 by which the tank can be mounted in any desired manner.

From the foregoing description taken together with the accompanying drawings it will be apparent that this invention provides a simple, inexpensive and easily practiced method for making a tank or pressure vessel having an inert and noncorrosive liner, which vessel is particularly suited for brine vessels and water softening tanks of water conditioning apparatus. It will also be apparent that the method of this invention can be practiced with inexpensive and readily available apparatus, and that high production rates can be attained with it, even with relatively unskilled labor.

What is claimed as my invention is:

1. The method of making a pressure vessel which comprises: forming a tubular blank, with uniform thickness walls, of homogeneous thermoplastic material having good form retaining characteristics; forming a rigid metal shell having a length at least substantially equal to that of said blank and having coaxial bores of a diameter substantially equal to the outside diameter of said blank opening to its opposite ends and communicating with a larger diameter hollow interior of the shell; inserting the blank into the shell, with the end portions of the blank received in the bores in the shell; passing live steam through the blank to heat the blank to a temperature at which it is readily deformable; by the pressure of live steam inside the blank expanding the medial portion of the blank to force all portions of its exterior surface into intimate engagement with the interior surface of the shell; and forcing air into the blank under pressure to drive steam out of the blank and cool the formed blank while maintaining pressure upon the interior of the blank by which its medial portion is kept expanded.

2. The method of making a pressure vessel comprising an exterior metal shell having coaxial bores of equal diameter opening to its opposite ends and to a larger diameter interior cavity in its medial portion, and an inert liner which extends through the shell from one end to the other thereof, which method is characterized by the steps of: forming a tubular thermoplastic blank having a uniform thickness wall and having an outside diameter equal to the diameter of said bores in the shell and a length at least substantially equal to that of said shell; inserting the liner axially into the shell with end portions of the blank received in the bores in the shell; inserting tightly fitting plugs into both end portions of the blank to radially clamp said end portions of the blank against the inner surfaces of said bores in the shell; circulating live steam into the blank through one of said plugs while restricting the flow of steam out of the blank through the other plug, to thus heat the blank and subject its interior to pressure by which the medial portion of the blank is expanded into contact with the interior surface of the shell; forcing air under pressure into the blank, along with live steam, while preventing the escape of fluid from the interior of the blank, to subject the interior of the blank to higher pressure by which all portions of the blank are expanded into intimate contact with the interior surface of the shell; stopping the flow of steam into the blank while continuing to force air thereinto, and while permitting steam and air to escape through said other plug at a rate which maintains the interior of the blank under pressure, to thus cool the blank and hold it expanded; and removing the plugs after the blank has cooled below its plastic temperature.

3. The method of claim 2, further characterized by the step of installing end closures on the opposite ends of the shell after the plugs have been removed.

References Cited in the file of this patent

UNITED STATES PATENTS

| | | |
|---|---|---|
| 720,348 | Holzer | Feb. 10, 1903 |
| 2,106,496 | Debor | Jan. 25, 1938 |
| 2,608,501 | Kimble | Aug. 26, 1952 |
| 2,847,959 | Switzer | Aug. 19, 1958 |